US010641675B2

(12) United States Patent
Boccellato et al.

(10) Patent No.: US 10,641,675 B2
(45) Date of Patent: *May 5, 2020

(54) SCREWER TEST BENCH WITH BIDIRECTIONAL CONTROL

(71) Applicant: SCS CONCEPT ITALIA SRL, Cusano Milanino (IT)

(72) Inventors: Roberto Boccellato, Seriate (IT); Carlo Giuseppe Tinti, Noviglio (IT)

(73) Assignee: SCS Concept S.R.L., Cusano Milanino (IT)

( * ) Notice: Subject to any disclaimer, the term of this patent is extended or adjusted under 35 U.S.C. 154(b) by 36 days.

This patent is subject to a terminal disclaimer.

(21) Appl. No.: 15/564,291

(22) PCT Filed: Apr. 18, 2016

(86) PCT No.: PCT/IB2016/052203
§ 371 (c)(1),
(2) Date: Oct. 4, 2017

(87) PCT Pub. No.: WO2016/170463
PCT Pub. Date: Oct. 27, 2016

(65) Prior Publication Data
US 2018/0136070 A1    May 17, 2018

(30) Foreign Application Priority Data
Apr. 22, 2015  (IT) ........................ 102015000012694

(51) Int. Cl.
*G01N 19/00* (2006.01)
*G01L 25/00* (2006.01)
(Continued)

(52) U.S. Cl.
CPC .................................. *G01L 25/003* (2013.01)

(58) Field of Classification Search
CPC .. G01N 3/22; G01L 3/20; G01L 5/243; G01L 25/003; B25B 21/00; B25B 23/1425; B25B 23/14; B25H 1/005; G01C 17/00
See application file for complete search history.

(56) References Cited

U.S. PATENT DOCUMENTS 5,886,246 A     3/1999  Bareggi et al.
6,810,747 B2 * 11/2004  Engler .................. G01L 5/24
                                                             73/761
(Continued)

OTHER PUBLICATIONS

International Search Report dated Jul. 29, 2016 in International Application No. PCT/IB2016/052203.
(Continued)

*Primary Examiner* — Brandi N Hopkins
(74) *Attorney, Agent, or Firm* — Perkins Coie LLP; Viola Kung

(57) ABSTRACT

Within a test bench for screwdrivers, comprising a braking unit (11) with a brake (14) equipped with a fitting (12) for a screwdriver to be tested and transducers (15) for the measurement of angle and torque, a method for controlling the brake (14) comprises a step wherein movement along a torque/angle curve (17) is controlled in a bidirectional manner, in the sense that the brake is controlled according to a curve whose torque values are based on the angle during both decremental progression of the angle and incremental progression of the angle.
The method can also comprise a step consisting of setting a starting Cstart torque value other than zero and following the torque/angle curve (17) from the said Cstart value during a screwdriver test.

7 Claims, 2 Drawing Sheets

(51) Int. Cl.
B25H 1/00 (2006.01)
B25B 21/00 (2006.01)

(56) References Cited

U.S. PATENT DOCUMENTS

| | | | |
|---|---|---|---|
| 8,108,158 B2* | 1/2012 | Hetzel | G05D 16/2053 |
| | | | 702/43 |
| 2003/0056564 A1* | 3/2003 | Chiapuzzi | G01L 5/0042 |
| | | | 73/1.09 |
| 2003/0056605 A1 | 3/2003 | Chiapuzzi et al. | |
| 2003/0057034 A1* | 3/2003 | Chiapuzzi | F16D 55/28 |
| | | | 188/71.1 |

OTHER PUBLICATIONS

Italian Search Report dated Jan. 7, 2016 in Italian Application No. 102015000012694 (IT2015UB00151).

* cited by examiner

SCREWER TEST BENCH WITH BIDIRECTIONAL CONTROL

This application is a National Stage of International Application PCT/IB2016/052203, filed Apr. 18, 2016, published Oct. 27, 2016, under PCT Article 21(2) in English; which claims the priority of Italian Application No. 102015000012694, filed Apr. 22, 2015. The contents of the above-identified applications are incorporated herein by reference in their entireties.

The present invention relates to an innovative test bench for screwdrivers featuring enhanced control of test performance.

For regular testing of power screwdrivers, test benches are used which are equipped with a joint that simulates a screw being tightened by the screwdriver being tested and the behaviour of the screwdriver is measured by the test bench.

To simulate a screw, the joint on the bench is connected to a brake (usually hydraulically operated), which is instructed by an electronic control unit to follow a preset braking curve which simulates the predetermined type of screw joint, allowing the bench to test whether the screwdriver continues to maintain its initial calibration parameters during the tightening cycle. The benches' preset braking curves usually follow a route which, in a Cartesian representation of torque/angle, starts from the zero torque point with the rotation angle at zero and proceeds along a first slope (called the "pre-tightening slope") to reach a tightening starting point, from which a second slope starts with a higher gradient (called the "tightening slope"), which continues to a point corresponding to the simulated screw's initial yield torque/angle. After this point there is a third slope, with a lower gradient, which simulates the area of plastic behaviour of the screw.

Once the curve which the braked joint is to follow has been set, the bench measures (using the angle and torque sensors thereof located on the joint) whether the screwdriver behaves correctly along the said curve, by—for example— tightening with a predetermined acceleration or speed or with a stopping accuracy at a set maximum torque, etc.

Once the maximum torque at which the screwdriver stops its action has been reached, the brake is completely released and the bench is ready for a new test cycle.

Although this way of operating is generally found in all known test benches, the holder of the present application has found that the result delivered in the test does not always coincide with the reality, where the screwdriver tested does not meet the desired working parameters.

The general aim of the present invention is to provide a test bench which allows greater precision during tests and ensures more accurate testing of the calibration of a screwdriver.

In view of these aims, the decision was made to produce—in accordance with a first aspect of the invention—a control method for a test bench for screwdrivers, comprising a braking unit with a brake equipped with a fitting for a screwdriver to be tested and transducers for the measurement of angle and torque, the said brake being instructed by a control unit to follow, during a screwdriver test, a torque/angle curve, and the method comprising a step wherein movement along the torque/angle curve (17) is controlled in a bidirectional manner, in the sense that the brake is controlled according to a curve whose torque values are based on the angle during both decremental progression of the angle and incremental progression of the angle.

According to a further aspect of the invention, the decision was made to produce a control method comprising steps consisting of setting a starting Cstart torque value other than zero and following the torque/angle curve from the said Cstart value.

The decision was also made to produce—in accordance with the invention—a test bench for screwdrivers comprising a braking unit with a brake equipped with a fitting for a screwdriver to be tested and transducers for the measurement of angle and torque, the said brake being controlled by a control unit according to the method set out above, which shall emerge more clearly in the following description.

To provide a clearer explanation of the innovative principles of the present invention and the advantages thereof with respect to the commonly known technique, an exemplifying embodiment in which the said principles are applied will be described below, with the help of the accompanying drawings. In the drawings.

Figure 1:
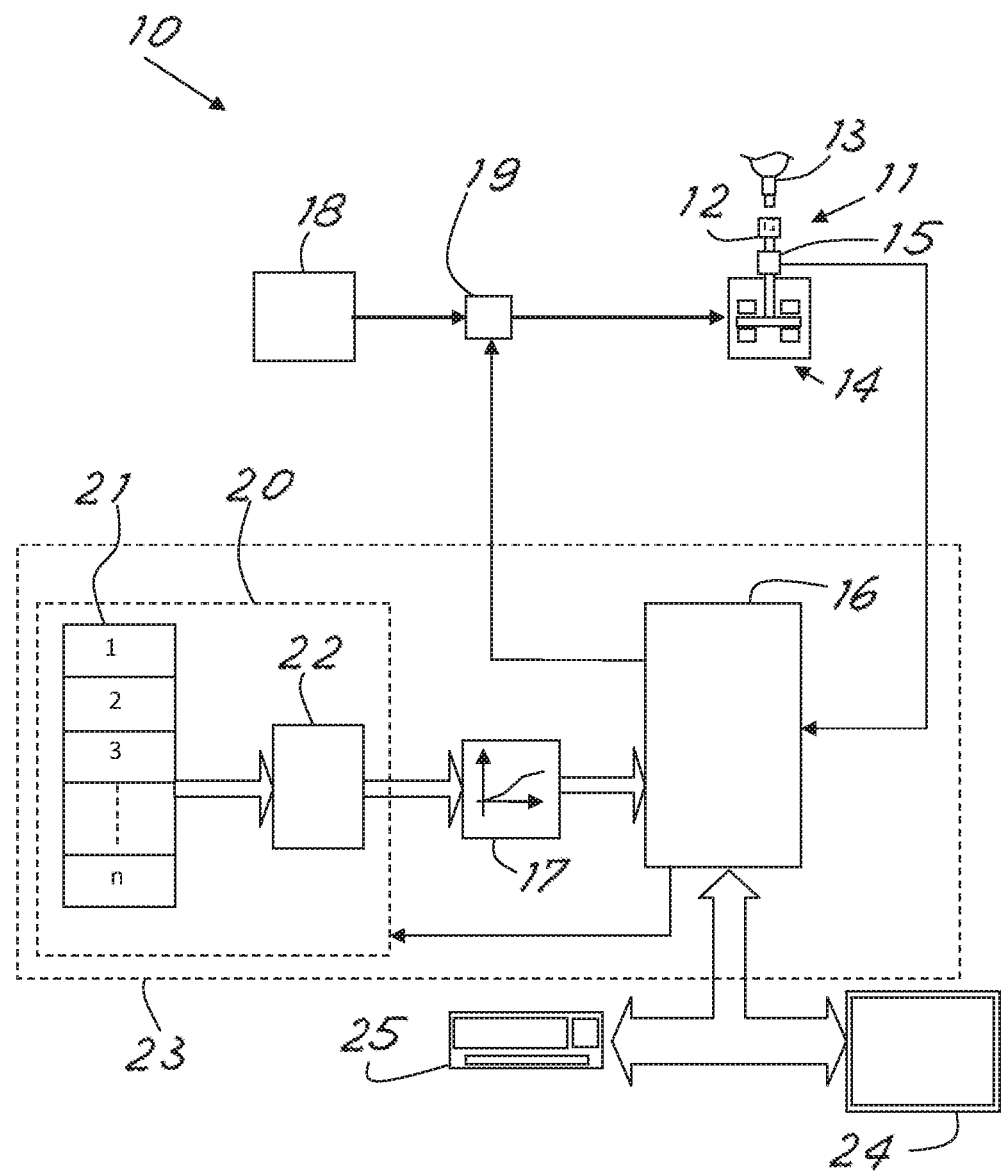
FIG. 1 is a schematic perspective view of a test bench according to the invention.

With reference to the figures, FIG. 1 shows, schematically, a test bench as a whole denoted by the number 10, produced by applying the principles of the invention.

The bench 10 comprises a braking unit 11 equipped with a fitting 12 (possibly of the replaceable kind) for coupling with the corresponding end of a screwdriver 13 to be tested.

The braking unit includes a brake 14 and a commonly known transducer unit or torque and angle sensor 15 connected to the brake (advantageously located between the fitting 12 and the brake 14).

The brake is controlled by a control unit 16, advantageously produced using a commonly known system microprocessor which is suitably programmed, which controls the braking force of the brake according to predetermined torque/angle curves 17.

As is known for test benches, the control unit 16 receives information from the transducer unit 15 including the rotation angle and the torque transmitted, in order to both control the brake so as to apply torque providing a level of resistance based on the angle measured (following the said predetermined torque/angle curve simulating the screw) and to test the operating parameters of the screwdriver being tested.

As easily imaginable by persons skilled in the art, the type of brake control system employed by the control unit depends on the type of brake used. For example, in the event of a hydraulic brake, the control unit can control the delivery to the brake 14 of fluid under pressure from a suitable source 18 through a suitable electrically powered control valve 19, advantageously of a proportional kind. The invention described here is, however, applicable to any other type of brake usable for a test bench. For example, with an electromagnetic brake, the source 18 will be an electrical source and the valve 19 will be replaced by an electrical modulation system of the control power transmitted to the electromagnetic brake.

The torque/angle braking curves 17 are sent to a control unit 16 by a selection unit 20 which, advantageously, comprises a memory 21 and a processing unit 22.

The control unit 16 controls the selection unit 20 so as to obtain the brake control values as a function of the angle measured, and required for the desired screwdriver test operation.

As easily imaginable by persons skilled in the art, the braking curves 17 can be set in the memory 21, for example entirely point by point (with a very close series of pairs of torque and angle values), or the said curves can be set by storing solely some of the main points on the curve in the memory 21, or some representative values, and the intermediate values can be obtained through the use of suitable mathematical formulas for the interpolation of the trend of the curve between such points processed by the processing unit 22. The terms 'main points' or 'representative values' are intended as those points or the values on the curve from which the totality of the desired curve can be derived.

For example, if the curves are composed of polylines, the information to be stored in the memory 21 may consist solely of the coordinates of the points on the Cartesian plane marking the start, changes in gradient, and the end of each curve, and the trend between the points can be easily calculated mathematically by the processing unit as simply straight line segments linking pairs of successive main points.

Naturally, the mathematical formulas for interpolation can also be stored in the memory 21, associated with each curve (in the case, for example, that such formulas differ from one curve to another) or be programmed in the processing unit (in the case, for example, that such formulas are identical for all the curves or for a set of curves) so that the processing unit has to retrieve solely the main points (of the curve to be calculated) from the memory 21. This is, however, easily imaginable by persons skilled in the art in light of the description—provided herein—of the system according to the invention.

Naturally, the processing unit 22, the control unit 16 and, possibly, also the memory 21 can be integrated within a single suitably programmed microprocessor-based processing system (denoted by 23), as is easily imaginable by a person skilled in the art.

The control unit 16 is also advantageously connected to commonly known user interface peripherals such as a screen 24 (possibly of the touchscreen kind) and a keyboard 25, for entering commands and viewing results.

In this way, the user can select—through the user interface—an appropriate control curve for the brake depending on the screwdriver to be tested. Naturally, such selection can be made either by selecting a curve directly or by setting information about the screwdriver (such as the brand and model, serial number, type of use, etc.) which allows the control unit 16 to select the most appropriate test curve from the selection unit (and/or memory 17) or to propose test curves or test types from which the user can make the selection.

Figure 2:
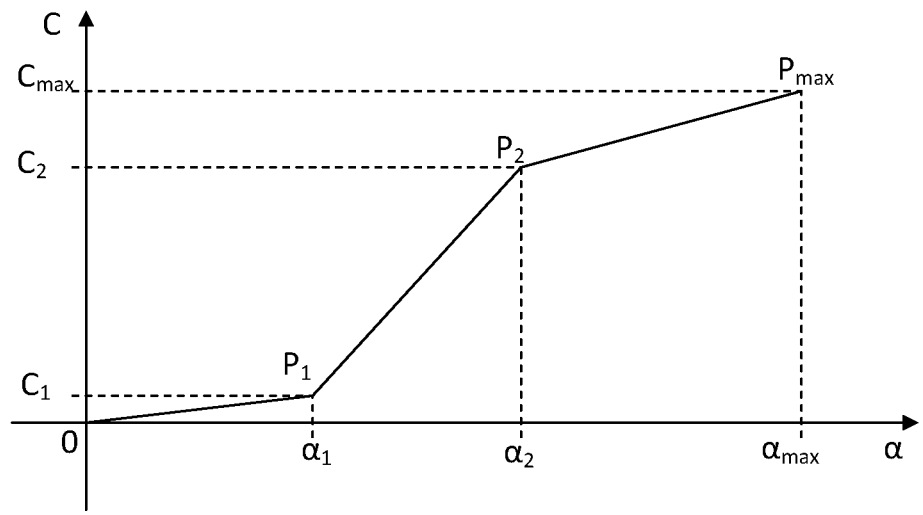
FIGS. 2 and 3 are Cartesian diagrams of possible curves exemplifying the control of the braking joint on the bench in FIG. 1.

FIG. 2 shows the trend of a possible conventional braking curve 17 on the Cartesian plane of the torque based on the angle. This example curve is a classic polyline with point of origin 0 on the Cartesian plane and main points P1 ($C_1, \alpha_1$), P2 ($C_2, \alpha_2$), and Pmax ($C_{max}, \alpha_{max}$). The first line segment between 0 and P1 represents the pre-tightening slope, the second line segment between P1 and P2 represents the tightening slope and the third line segment between P2 and Pmax represents the area of plastic behaviour.

Naturally, the actual values of points P1, P2, and Pmax (stored in memory 21) will vary depending on the screwdriver to be tested, as is known by persons skilled in the art.

With this curve, a screw can be simulated which progresses from the non-tightened condition to the maximum tightening condition. The holder of the present application has found, however, that it is not always suitable in order to fully or, in any case, efficiently, test the correct calibration of a screwdriver.

According to one aspect of the invention, the bench according to the invention may comprise an advantageous innovative feature regarding the braking curve followed by the test bench. According to the said innovative feature, the bench may envisage control of the brake by the control unit in order to use the said curve 17 also during a brake release phase, as well as during the normal braking step, as—meanwhile—occurs in the commonly known technique. In other words, the braking curve can be rendered bidirectional, in the sense that the brake is instructed to follow the braking curve for both increases in the angle α (measured by the angle sensor 15) and decreases in the said angle. This can be preferably limited, for example, to the progression of the curve up to the torque/angle value set as the start of the plastic behaviour of the screw simulated by the bench with the torque/angle curve.

The method according to the invention using the curve bidirectionally has also been found to be particularly advantageous for successfully testing screwdrivers which have a tightening curve which involves momentary untightening movements during the tightening of a screw. In cases like this, a conventional test bench can misperform the screwdriver test.

For example, a conventional bench usually ends the test when it reaches the maximum torque value set for the screwdriver, completely releasing the brake so as to bring the latter back to zero for the start of the next test. In the event, however, that the screwdriver were set to reach the maximum value by means of one or more slight untightening movements prior to the final tightening, such oscillations would not be managed properly by the joint simulated by the to brake, and the measurement of the final torque value produced by the screwdriver prior to stopping would be out of line, i.e. if the screwdriver tested is electronic, the said screwdriver would detect the behaviour of the simulated joint during the untightening step as abnormal and would interrupt the tightening without reaching the final torque value, thereby preventing completion of the test.

According to a further aspect of the invention, it has also been found that, for some screwdrivers or for some test or use conditions, whether or not correct calibration is detected can also vary in a non-negligible way if the screwdriver needs to be used for pre-tightened screws rather than for screws that need to be tightened completely. Moreover, even in the event that the screwdriver does not alter its own behaviour when changing from one case to another, the test time can be excessively and unnecessarily long, especially when the screwdriver has a low speed or low acceleration, because the screwdriver subjected to testing is made to start from 0. This can also be very expensive in the event that the screwdriver testing requires not one test but a series of tightening tests. In addition to the loss of time, a very close sequence of activations of the screwdriver subjected to testing throughout the duration of the pre-tightening slope (from 0 to the starting point for the tightening) may result in strain on the screwdriver which alters the final test, constituting a condition which does not occur in normal use, as between one tightening step and another the screwdriver normally switches to the resting condition when moving from one screw to be tightened to another. Moreover, in some cases, following the entire tightening curve from the start has been found unnecessary and results in a waste of time during the test and undue strain on the screwdriver. In particular, in some cases, the sole reason for the test is to establish whether or not the calibration parameters of the screwdriver are correct at a much later point on the curve, for example, in the vicinity of the screw yield point or even beyond such yield point.

In the test bench according to the invention it is therefore also advantageously envisaged that it is possible to instruct the control unit 16 to select a braking action starting point somewhere on the braking curve other than 0 (i.e. other than the point at which torque is zero and the angle is zero). In particular, at the beginning of a test, the brake is advantageously instructed to start from a desired 'Cstart' torque value which is not zero, rather than from the zero torque value. During the test, the screwdriver will therefore follow the curve from Cstart onwards.

Essentially, according to one aspect of the invention, the entire braking curve is shifted to the left, on the Cartesian plane, so that the said curve intersects the vertical axis at the point with the predetermined Cstart torque value. The said Cstart value can be also usefully be stored in the memory 21, so that the processing unit 22 produces the new shifted curve 17 directly. Alternatively, it can also be the control unit 16 which—after receiving the normal curve 17 (starting at the origin) and the Cstart value, finds the angle value corresponding to the Cstart value on the curve and subtracts such angle value from the angle values gradually measured by the angle sensor 15 so as to obtain the torque values to be gradually transmitted to the brake, starting from Cstart.

Figure 3:
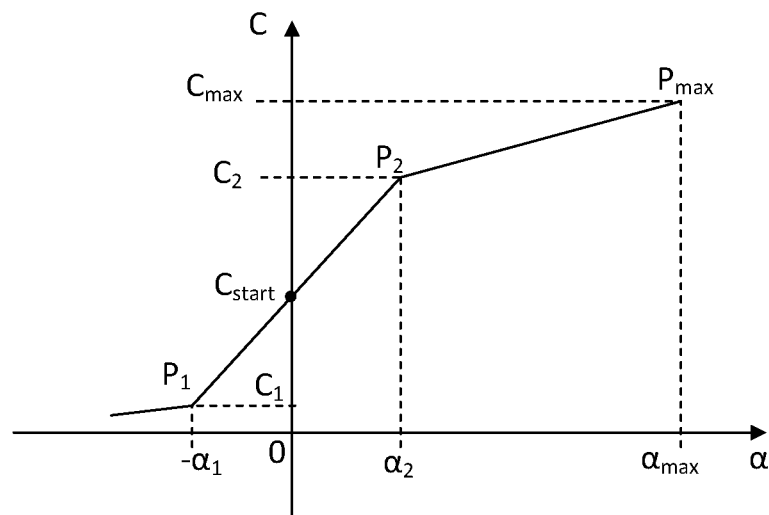

In any case, the torque/angle curve followed by the brake can be of the kind shown, by way of example, in FIG. 3.

The Cstart value will depend on the pre-tightening (or tightening) value from which it is desired that the test be desired. This value can depend on the type of screwdriver and the normal use thereof, and even the (pre-)tightening value which the real screw would normally have when the screwdriver encounters the screw during use in the field. As with the selection of the normal curve starting from 0, the Cstart value can, for example, be entered directly by the user via the user interface or set on the basis of information entered about the screwdriver (for example, brand and model, the serial number, type of use, etc.) which allows the control unit 16 to independently select the most suitable Cstart value or to propose Cstart values from which the user can make the selection.

According to such aspect of the invention, therefore, a method is advantageously applied according to which the brake 14 is instructed by the control unit 16 to follow, during a screwdriver test, a torque/angle curve 17 by setting a different starting Cstart torque value other than zero and following the torque/angle curve (17) from such Cstart value. Advantageously the method comprises the initial step consisting of the storage—in the memory 21 of the bench—of one or more torque/angle curves 17 or values or points which are representative of such curves for the generation of the curves 17, with such curves starting from a torque value of zero with an angle value of zero. During use of the bench, the desired curve for the screwdriver test is thus selected and the control unit shifts the curve so as to start from the Cstart torque value with a zero angle and controls the brake according to the shifted curve.

Thanks to the test method according to the aforesaid aspect of the invention, which envisages the possibility of starting the test from a desired torque value other than zero, a clear improvement was obtained in terms of flexibility and accuracy of the test bench compared with commonly known benches.

Moreover, even in the event of simulation of a joint starting from a point other than the zero torque point, it has been found advantageous to simulate a complete or partial untightening of the joint by the screwdriver prior to the tightening operation. This allows to adequately simulate the joint even in the event of screwdrivers which perform, for example, the abovementioned oscillations prior to reaching the maximum torque, starting from partially tightened joints, or those which are programmed to untighten (fully or partly) the partially tightened joint prior to performing the full tightening cycle.

In this event, the joint is set by the control unit to the desired Cstart value at the start of the test but for negative angle values (from the zero angle point to the start of the test), the brake is activated to decrease braking action, following the braking curve selected "backwards", until the screwdriver resumes action in the tightening direction, resulting in the resumption of the braking curve route in the normal direction.

Depending on the case, therefore, the bidirectional route follows a curve such as that shown in FIG. 2 or in FIG. 3.

At this point, it is clear that the invention achieves the aims set by providing a bench and operating method therefor which allow a wide range of screwdrivers to be tested adequately and with great accuracy.

Naturally, the description set out above of an embodiment applying the innovative principles of the present invention is given by way of example of such innovative principles and therefore must not be deemed a limitation of the patent right claimed here. For example, the braking curves produced and followed by the system can differ from those shown as examples in the drawings and can, for example, be formed of continuous curved lines rather than polylines, or can have a greater number of line segments, as easily imaginable by the person skilled in the art.

The invention claimed is:

1. A control method for a test bench for screwdrivers, comprising a braking unit with a brake equipped with a fitting for a screwdriver to be tested and transducers for measurement of angle and torque, the brake being instructed by a control unit to follow, during a screwdriver test, a torque/angle curve, and the method comprising the step of controlling movement along the torque/angle curve in a bidirectional manner such that the brake is controlled to apply a torque value to the fitting according to the torque/angle curve with torque values being a function of angle values measured by the transducers during both decremental progression of the angle and incremental progression of the angle.

2. The method according to claim 1, wherein the progression of the curve is followed up to the torque/angle value set as a start of a plastic behaviour of the screw simulated by the test bench with the torque/angle curve.

3. The method according to claim 1, comprising the steps of:
setting a starting Cstart torque value other than zero and following the torque/angle curve from the said Cstart value.

4. The method according to claim 3, comprising the steps of:
storing—in a memory of the test bench—one or more torque/angle curves or values or points which are representative of such curves, for generation of the curves, with such curves starting from a torque value of zero and an angle value of zero,
selecting the curve to test a screwdriver,
shifting the curve in order to start from a Cstart torque value with a zero angle value, and
controlling the brake according to the shifted curve.

5. A test bench for screwdrivers comprising a braking unit with a brake equipped with a fitting for a screwdriver to be tested and transducers for measurement of angle and torque and a control unit controlling the brake, the control unit being adapted to control the brake according to at least one torque/angle curve in a bidirectional manner as a function of the angle measured by the transducers during both decremental progression of the angle and incremental progression of the angle.

6. The test bench according to claim 5, further comprising a selection unit for selection of a braking curve from a plurality of braking curves, the selection unit comprising a memory containing one or more torque/angle curves or values or points which are representative of such curves for the generation of the curves, and a processing unit for the calculation of a selected braking curve, connected to the control unit for the control of the brake according to the selected braking curve.

7. The bench according to claim 5, wherein the brake is hydraulically operated brake connected to a source of pressurised fluid via an electrically powered proportional valve controlled by the control unit.

* * * * *